United States Patent [19]

Carlsen et al.

[11] Patent Number: 4,474,434
[45] Date of Patent: Oct. 2, 1984

[54] POLARIZATION-INSENSITIVE OPTICAL SWITCH APPARATUS

[75] Inventors: W. John Carlsen, Boston; Paul Melman, Newton, both of Mass.

[73] Assignee: GTE Laboratories Incorporated, Waltham, Mass.

[21] Appl. No.: 327,873

[22] Filed: Dec. 7, 1981

[51] Int. Cl.³ .............................................. G02F 1/03
[52] U.S. Cl. ................................... 350/381; 350/388
[58] Field of Search ............... 350/383, 381, 380, 382, 350/388

[56] References Cited

U.S. PATENT DOCUMENTS

3,499,701  3/1970  Macek et al. ...................... 350/380
3,632,187  1/1972  Habegger ........................... 350/381

Primary Examiner—Bruce Y. Arnold
Attorney, Agent, or Firm—Fred Fisher

[57] ABSTRACT

Polarization-insensitive optical switch and dual channel carrier multiplexer includes a polarization beam splitter for receiving an input collimated beam which has arbitrarily polarized components, splitting the beam into the two components. One of the components is rotated by a ½ wave plate so as to yield a polarized beam which is polarized in the same direction as the other beam. The two polarized beams are then applied to a polarization sensitive interferometric multimode fiber optic switch and modulator. The output of the interferometric multimode fiber optic switch and modulator contains two beams, both polarized in the same direction. One of the beams is rotated ninety degrees by a 178 wave plate, and the two mutually perpendicularly polarized beams are then recombined by a polarization beam splitter operated in reverse to yield an output beam containing mutually perpendicular components.

4 Claims, 6 Drawing Figures

POLARIZATION-INSENSITIVE OPTICAL SWITCH APPARATUS

BACKGROUND OF THE INVENTION

1. Field of the Invention

This invention relates to polarization-insensitive optical switch apparatus, polarization-insensitive optical multiplexing apparatus, and interferometric multimode fiber optic apparatus in which the indices of refraction of various beam paths through portions thereof can be varied with respect to that of other portions. Accordingly, it is the general object of this invention to provide new and improved apparatus of such character.

2. Decription of the Prior Art

Polarization-insensitive switching of multimode fibers has been achieved by means of mechanical switches which move an input fiber into alignment with two output fibers, at two stable positions.

Electronic carrier multiplexing of two optical signals has been accomplished. Usually, the multiplexing stage is performed electronically; the resulting signal modulates the current through a light source. The drive currents to two different light sources can be modulated, and the two signal carrying fibers can be combined into a single communication fiber by means of a fiber combiner.

Disadvantageously, mechanical switching is slow, is power consuming, is usually operated at high voltages, is cumbersome, and is unreliable.

Disadvantageously, the multiplexing techniques (in which a single light source is modulated by the already multiplexed signal) requires very high linearity of the modulated source in order to prevent crosstalk. The light sources used in communication systems have non-uniform, nonlinear responses, sufficient to make this method inapplicable in many cases.

The modulation of the drive currents of two different light sources, utilizing an optical combiner, disadvantageously has at least a 50%, or 3 dB, loss due to the principle of combination of two light beams. Typical losses described in the literature are approximately 4 dB.

SUMMARY OF THE INVENTION

It is another object of this invention to provide a new and improved polarization-insensitive optical fiber switch and dual channel carrier multiplexer.

Yet another object of this invention is to provide a new and improved optical switch apparatus in which operation is very fast compared to mechanical switching.

Still another object of this invention is to provide a new and improved low-loss device for optical switching and optical multiplexing which is polarization-insensitive.

Devices in accordance with this invention are of a low-loss nature due to the collimating optics and the large aperture of an interferometric multimode fiber optic switch and modulator, such as that described in our copending U.S. application Ser. No. 317,362, filed Nov. 4, 1981 and entitled "INTERFEROMETRIC MULTIMODE FIBER OPTIC SWITCH AND MODULATOR". Its polarization-insensitivity facilitates the apparatus for use with unpolarized light sources, such as LEDs. In a multiplexing configuration, the light source linearity problem and the combiner losses are eliminated. Its complementary output provides a second channel (or a monitoring signal) without the interruption of the light beam.

Still another object of this invention is to provide a new and improved polarization-insensitive electro-optical switch for use with multimode fibers.

Yet another object of this invention is to provide a new and improved modulator which can modulate two polarizations of an unpolarized light source with different signals.

Still yet another object of this invention is to provide a new and improved apparatus for multiplexing in which the 3 dB loss from the beam recombination process in a two signal multiplexing scheme can be eliminated.

Yet still another object of this invention is to provide for a polarization-insensitive fast multimode optical fiber switch or modulator, or a dual channel electronic carrier frequency multiplexer using a single light source and single fiber, in which, when operated in a switch mode, polarization losses inherent in electro-optical devices are eliminated, and when operated in a multiplexer mode, losses inherent in optical combiners due to basic optic restrictions are eliminated.

In accordance with one embodiment of the invention, a polarization-insensitive optical switch apparatus for switching a collimated input beam between two output means comprises a first polarization beam splitter for receiving and splitting the collimated input beam into two perpendicularly polarized beams. A first polarization rotating means rotates a first of the two perpendicularly polarized beams by ninety degrees so that the rotated beam and a second of the perpendicularly polarized beams are each polarized in the same direction. One of the first and the second beams is reflected so that the reflected beam and the other of the first and second beams traverse parallel paths. A first electro-optical crystal has a first surface adapted to receive the reflected one beam and the other beam for transmission therethrough. The first crystal contains a second surface which is adapted to receive the transmitted beams from the first surface thereof at a first pair of spots. The crystal further contains a first reflective surface which is oriented to receive light beams from the first pair of spots and to reflect such light beams. The crystal further has a third surface which is adapted to receive the reflected light beams from the first reflective surface of the first crystal upon a second pair of spots. The crystal further contains a fourth surface which is adapted to externally pass light beams impinged thereupon from the second pair of spots. A second electro-optical crystal has a first surface. The second crystal further has a second surface which is oriented to receive transmitted light from the second surface of the first crystal at a first pair of spots. The second crystal further contains a first reflective surface which is oriented to receive light from the first pair of spots of the second surface of the second crystal and to reflect such received light. The second crystal further contains a third surface which is adapted to receive the reflected light from the first reflective surface of the second crystal upon a second pair of spots, the second crystal having a fourth surface which is adapted to externally pass light beams impinged thereupon from the second pair of spots of the second crystal. The embodiment further includes a dielectric beam splitting coating. The beam splitting coating and the two crystals are so oriented that the first pairs of spots of the two crystals are substantially juxtaposed with a first portion of the coating oriented therebetween. The second pairs of spots of the two crystals are substantially juxtaposed with a portion of the coating oriented therebetween. The index of refraction of one of the crystals can be varied with respect to that of the other. Means are associated with the fourth surface of the first crystal for reflecting one light beam from one spot of the second pair of spots thereof. A second polarization rotating means rotates a first of the light beams from the fourth surface of the first crystal by ninety degrees so that the rotated first light beam and the unrotated second light beam are mutually perpendicularly polarized. A second polarization beam splitter, which is operated in reverse, is coupled to receive the perpendicularly polarized output beams from the first crystal and to provide a first single light beam which can be coupled to a first optical output means. Means are associated with the fourth surface of the second crystal for reflecting one light beam from one spot of the second pair of spots thereof. A third polarization rotating means rotates a first of the light beams from the fourth surface of the second crystal by ninety degrees so that the rotated first light beam and the unrotated second beam, from the second crystal, are mutually perpendicularly polarized. A third polarization beam splitter, which is operated in reverse, is coupled to receive the perpendicularly polarized output beams from the second crystal, and to provide a second single light beam which can be coupled to a second optical output means.

In accordance with still another object of the invention, polarization-insensitive optical switch apparatus for switching a pair of collimated input beams between two output means includes a first polarization beam splitter for receiving and splitting one of the collimated input beams into two perpendicularly polarized beams. A first polarization rotating means rotates a first of the two perpendicularly polarized beams by ninety degrees so that the rotated polarized beam and a second of the perpendicularly polarized beams are each polarized in the same direction. One of the first and the second beams is reflected so that the reflected beam and the other of the first and the second beams traverse parallel paths. A first electro-optical crystal has a first surface adapted to receive the reflected one beam and the other beam for transmission therethrough. The first crystal further has a second surface which is adapted to receive transmitted beams from the first surface at a first pair of spots. The first crystal has a first reflective surface which is oriented to receive light beams from the first pair of spots and to reflect such light beams, the first crystal further having a third surface adapted to receive the reflected light beams from the first reflective surface thereof upon a second pair of spots. The first crystal further has a fourth surface which is adapted to externally pass light beams impinged thereupon from the second pair of spots. The embodiment further includes second means associated with the fourth surface of the first crystal for reflecting one light beam from one spot of the second pair of spots. A second polarization rotating means rotates the first of the light beams from the fourth surface of the first crystal by ninety degrees so that the rotated first light beam and the unrotated second light beam are perpendicularly polarized with respect to each other. A second polarization beam splitter, which is operated in reverse, is coupled to receive the perpendicularly polarized output beams from the first crystal, and to provide a first single light beam which can be coupled to a first optical output means. A third polarization beam splitter receives and splits the other of the collimated input beams into two perpendicularly polarized beams. A third polarization rotating means rotates a first of the two perpendicularly polarized beams from the third polarization beam splitter by ninety degrees so that the rotated beam and a second of the perpendicularly polarized beams from the third polarization beam splitter are each polarized in the same direction. A third means reflects one of the first and the second beams from the third polarization rotating means so that the reflected beam and the other of the first and the second beams from the third polarization rotating means traverse parallel paths. A second electro-optical crystal has a first surface which is adapted to receive the one beam reflected by the third means and the other beam from the third polarization rotating means for transmission through the second crystal. The second crystal has a second surface which is adapted to receive the transmitted beams from the first surface of the second crystal at a third pair of spots, the second crystal having a first reflective surface which is oriented to receive light beams from the third pair of spots of the second surface thereof and to reflect such light beams. The second crystal further has a third surface adapted to receive such reflected light beams from the first reflective surface thereof upon a fourth pair of spots, and a fourth surface adapted to externally pass light beams impinged thereupon from the fourth pair of spots thereof. The embodiment further contains a dielectric beam splitting coating. The coating, the first crystal, and the second crystal are so oriented that the first pair of spots of the second surface of the first crystal, and the third pair of spots of the second crystal are substantially juxtaposed with a first portion of the coating oriented therebetween; a second pair of spots of the first crystal and a fourth pair of spots of the second crystal are substantially juxtaposed with a second portion of the coating oriented therebetween. Means are provided for varying the index of refraction of one of the crystals with respect to that of the other. Fourth means, associated with the fourth surface of the second crystal, reflect one light beam from one of the fourth pair of spots of the second crystal. A fourth polarization rotating means rotates a first of the light beams from the fourth surface of the second crystal by ninety degrees so that the rotated first light beam from the second crystal and the unrotated second light beam from the second crystal are mutually perpendicularly polarized. A fourth polarization beam splitter, which is operated in reverse, is coupled to receive the perpendicularly polarized output beams from the second crystal and to provide a second single output light beam which can be coupled to a second optical light means.

In accordance still yet with another embodiment of the invention, polarization-insensitive optical multiplexing apparatus for independently modulating perpendicularly polarized components of a collimated input beam includes a first polarization beam splitter for receiving and splitting the input beam into two perpendicularly polarized beams. A first polarization rotating means rotates a first of the two perpendicularly polarized beams by ninety degrees so that the rotated polarized beam and a second of the perpendicularly polarized beams are each polarized in the same direction. Means are provided for reflecting one of the first and the second beams so that the reflected beam and the other of the first and the second beams traverse parallel paths. A first electro-optical crystal has a first surface which is adapted to receive the reflected one beam and the other beam for transmission therethrough. The first crystal has a second surface which is adapted to receive such transmitted beams from the first surface at a first pair of spots. The first crystal has a first reflective surface which is oriented to receive light beams from the first pair of spots and to reflect such light beams. The first crystal further has a third surface adapted to receive such reflected light beams from the first reflective surface of the first crystal upon a second pair of spots; the first crystal has a fourth surface adapted to externally pass light beams impinged thereupon from the second pair of spots of the first crystal. The embodiment further includes a second electro-optical crystal which has a first surface and which has a second surface oriented to receive transmitted light from the second surface of the first crystal at a first pair of spots. The second crystal has a first reflective surface oriented to receive light from the first pair of spots of the second surface thereof and to reflect such received light. The second crystal further contains a third surface which is adapted to receive such reflected light from the first reflective surface thereof upon a second pair of spots. The second crystal further has a fourth surface which is adapted to externally pass light beams impinged thereupon from the second pair of spots thereof. The embodiment further contains a dielectric beam splitting coating wherein the coating, the first crystal, and the second crystal are so oriented that the first pairs of spots of the second surfaces of the two crystals are substantially juxtaposed with the first portion of the coating oriented therebetween. Second pairs of spots of the third surfaces of the two crystals are substantially juxtaposed with a second portion of the coating oriented therebetween. One beam and the other beam traverse a first and a second path, respectively, within the first crystal. One beam and the other beam traverse a third path and a fourth path, respectively, within a second crystal. The index of refraction of the first path within the first crystal is varied with respect to that of the third path within the second crystal. Also, the index of refraction of the second path within the first crystal is varied with respect to that of the fourth path within the second crystal, the variation of the indices of refraction being independent of each other. Means, associated with the fourth surface of the first crystal, reflect one light beam from one spot of the second pair of spots thereof. A second polarization rotating means rotates a first of the light beams from the fourth surface of the first crystal by ninety degrees so that the rotated first light beam and the unrotated second light beam are perpendicularly polarized with respect to each other. A second polarization beam splitter, operated in reverse, is coupled to receive the perpendicularly polarized light beams from the first crystal and to provide a first single light beam which can be coupled to a first optical output means. In accordance with certain features of the invention, the foregoing embodiment can include, in association with the fourth surface of the second crystal, means for reflecting one light beam from one spot of the second pair of spots of the second crystal. A third polarization rotating means rotates a first of the light beams from the fourth surface of the second crystal by ninety degrees so that the rotated first light beam and the unrotated second beam, from the second crystal, are mutually perpendicularly polarized. A third polarization beam splitter, operated in reverse, receives the perpendicularly polarized output beams from the second crystal and provides a second single light beam which can be coupled to a second optical output means.

In accordance with still yet another embodiment of the invention, a polarization-insensitive optical multiplexing apparatus for independently modulating perpendicularly polarized components of a pair of collimated input beams includes a first polarization beam splitter for receiving and splitting one of the input beams into two perpendicularly polarized beams. A first polarization rotating means rotates a first of the two perpendicularly polarized beams by ninety degrees so that the rotated polarized beam and a second of the perpendicularly polarized beams are each polarized in the same direction. A first means is provided for reflecting one of the first and the second beams so that the reflected beam and the other of the first and the second beam traverse parallel paths. A first electro-optical crystal has a first surface which is adapted to receive the reflected one beam and the other beam for transmission therethrough. The first crystal has a second surface which is adapted to receive the transmitted beams from the first surface thereof at a first pair of spots. The first crystal further has a first reflective surface which is oriented to receive light beams from the first pair of spots of the second surface thereof and to reflect such light beams. The first crystal further has a third surface which is adapted to receive the reflected light beams from the first reflective surface thereof upon a second pair of spots. The first crystal further has a fourth surface adapted to externally pass light beams impinged thereupon from the second pair of spots thereof. Thus, the one beam and the other beam traverse a first path and a second path, respectively, within the first crystal. Second means, associated with the fourth surface of the first crystal, reflect one light beam from one spot of the second pair of spots thereof. A second polarization rotating means rotates a first of the light beams from the fourth surface of the first crystal by ninety degrees so that the rotated first light beam and the unrotated second light beam are mutually perpendicularly polarized. A second polarization beam splitter, operated in reverse, is coupled to receive the perpendicularly polarized output beams from the first crystal and to receive a first single light beam which can be coupled to a first optical output means. A third polarization beam splitter receives and splits the other collimated input beam into two perpendicularly polarized beams. A third polarization rotating means rotates a first of the two perpendicularly polarized beams from the third polarization beam splitter by ninety degrees so that the rotated beam and a second of the perpendicularly polarized beams from the third polarization beam splitter are each polarized in the same direction. Third means reflects one of the first and the second beams from the third polarization rotating means so that the reflected beam and the other of the first and second beams from the third polarization rotating means traverse parallel paths. A second electro-optical crystal has a first surface which is adapted to receive one beam reflected by the third means and the other beam from the third polarization rotating means for transmission through the second crystal. The second crystal has a second surface adapted to receive such transmitted beams from the first surface thereof at a third pair of spots. The second crystal has a first reflective surface oriented to receive light beams from the third pair of spots of the second surface thereof and to reflect such light beams. The second crystal has a third surface adapted to receive such reflected light beams from the first reflective surface thereof upon a fourth pair of spots; the second crystal has a fourth surface adapted to to externallly pass light beams impinged thereupon from the fourth pair of spots thereof. Thus, one beam reflected by the third means and the other beam from the third polarization rotating means traverse a third path and a fourth path, respectively, within the second crystal. A dielectric beam splitting coating, the first crystal, and the second crystal are so oriented that the first pair of spots of the first crystal and the third pair of spots of the second crystal are substantially juxtaposed with a first portion of the coating oriented therebetween. The second pair of spots of the third surface of the first crystal and the fourth pair of spots of the second crystal are substantially juxtaposed with a second portion of the coating oriented therebetween. First means vary the index of refraction of the first path within the first crystal with respect to that of the third path within the second crystal. In similar fashion, second means vary the index of refraction of the second path within the first crystal with respect to that of the fourth path within the second crystal. Fourth means, associated with the fourth surface of the second crystal, reflects one light beam from one spot of the fourth pair of spots of the second crystal. A fourth polarization rotating means rotates a first of the light beams from the fourth surface of the second crystal by ninety degrees so that the rotated first light beam from the second crystal and the unrotated second light beam from the second crystal are perpendicularly polarized with respect to each other. A fourth polarization beam splitter, operated in reverse, is coupled to receive the perpendicularly polarized light beams from the second crystal and provides a second single output light beam which can be coupled to a second optical output means.

In accordance with still yet another embodiment of the invention, a combination includes a dielectric beam splitting coating which is affixed to portions of a first and a second electro-optical crystals with portions of crystals being juxtaposed. First means vary the index of refraction of one beam path through one of the crystals with respect to that of one beam path through the other. Second means vary the index of refraction of another beam path through one of the crystals with respect to that of another beam path through the other. The second means is independent from the first means. In accordance with certain features of the invention, the first means comprises a first set of electrodes deposited upon opposite portions of the crystals so as to encompass the one beam paths and the second means comprises a second set of electrodes deposited upon opposite portions of the crystals so as to encompass the other beam paths. The two sets of electrodes can be independent of each other.

In accordance with another embodiment of the invention, polarization-insensitive optical switching apparatus for switching a collimated input beam between two output conductors includes a first polarization beam splitter for receiving and splitting the input beam into two perpendicularly polarized beams. A first polarization rotating means rotates a first of the two perpendicularly polarized beams by ninety degrees so that the rotated polarized beam and a second of the perpendicularly polarized beams are each polarized in the same direction. Suitable means reflects one of the first and the second beams so that the reflected beam and the other of the first and the second beams traverse parallel paths. Polarization-sensitive interferometric multimode fiber optic switch means receives the reflected beam and the other beam at one input thereof, and selectively provides the reflected beam and the other beam at a first pair of outputs and at a second pair of outputs. Means associated with the first pair of outputs reflect a beam selected from the reflected beam and the other beam. A second polarization rotating means rotates a first of the light beams from the first pair of outputs by ninety degrees so that the rotated first light beam and the unrotated second light beam are mutually perpendicularly polarized. A second polarization beam splitter, operated in reverse, receives the perpendicularly polarized output beams and provides a first single light beam which can be coupled to a first optical output means. Means associated with the second pair of outputs reflect a beam selected from the reflected beam and the other beam. A third polarization rotating means rotates a first of the light beams from the second pair of outputs by ninety degrees so that the rotated first light beam and the unrotated second light beam from the second pair of outputs are perpendicularly polarized with respect to each other. A third polarization beam splitter, operated in reverse, receives the perpendicularly polarized output beams from the second pair of outputs, and provides a second single light beam which can be coupled to a second optical output means. In accordance with certain features of the invention, the index of refraction for one portion of the polarization-sensitive interferometric multimode fiber optic switch means is variable from that of a second portion thereof. The reflected one beam can traverse a first path and a second path within a first portion and a second portion, respectively, of the polarization-sensitive interferometric multimode fiber optic switch means. The other beam can traverse a third path and a fourth path within a third portion and a fourth portion, respectively, of the polarization-sensitive interferometric multimode fiber optic switch means. The index of refraction of the first portion can be varied from that of the second portion. The index of refraction of the third portion can be varied from that of the fourth portion.

BRIEF DESCRIPTION OF THE DRAWING

Other objects and features of this invention, together with its construction and mode of operation, will become more apparent from the following description, when read in conjunction with the accompanying drawing, in which.

DESCRIPTION OF PREFERRED EMBODIMENTS

A polarization-insensitive optical switch and dual channel carrier multiplexer, in accordance with this invention, utilizes the interferometric multimode fiber optic switch (IMFOS) described in a copending patent application by the applicants hereof, entitled "Interferometric Multimode Fiber Optic Switch and Modulator" U.S. application Ser. No. 317,362, filed Nov. 4, 1981. Broadly, an IMFOS, as described in the above-identified application, includes a dielectric beam splitting coating affixed to portions of two electro-optical crystals with coated portions of the crystals being juxtaposed. The index of refraction of one of the crystals is varied with respect to that of the other.

The teachings of the copending application are incorporated herein by reference.

Figure 1:
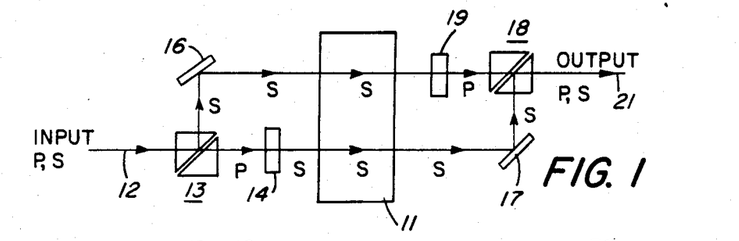
FIG. 1 is a schematic diagram of one embodiment of this invention.

Referring to FIG. 1, an IMFOS 11 is represented schematically as a rectangle. The IMFOS 11 is similar to that described in the copending application in which a beam path is modulated in accordance with an electrical field applied thereto. By the application of particular fields, a light beam is switched on and off or is modulated at varying intensities. The IMFOS 11, as depicted in FIG. 1 is polarization sensitive, and light of one polarity only is normally handled therethrough. In the embodiment depicted in FIG. 1, light, which is s plane polarized, is conveniently handled.

A collimated input beam 12 either can be unpolarized or can contain arbitrarily polarized light beams therewithin. The input beam 12 is split into two perpendicularly polarized beams, a p beam and an s beam, by a polarization beam splitter 13. The polarization beam splitter 13 can be constructed of birefrigent prisms, such as, for example, Rochon prisms, or multilayer interference polarizers.

The p polarized beam passes through a ½ wave plate 14 which converts it into an s polarized beam. The s polarized beam, split by the polarization beam splitter 13, is reflected by a mirror 16 so that it, and the s polarized beam emitted from the ½ wave plate 14, traverse parallel paths and enter the IMFOS 11.

The two s polarized beams that enter the IMFOS 11 undergo an interference and intensity redistribution as described more fully in the above-identified pending application.

As depicted in FIG. 1, the s polarized beam (which exited from the ½ wave plate 14 through the IMFOS 11) is reflected by a mirror 17 to another polarization beam splitter 18 which is operated in reverse. The s polarized beam, which had been reflected by the mirror 16 and past through the IMFOS 11, is rotated by a ½ wave plate 19 into a p polarized beam. The p polarized beam from the ½ wave plate 19 and the s polarized beam from the mirror 17 are recombined by the polarization beam splitter 18 (which operates in reverse) to provide an output signal or output beam 21 which contains mutually perpendicular polarized beams p and s.

Figures 2, 3:
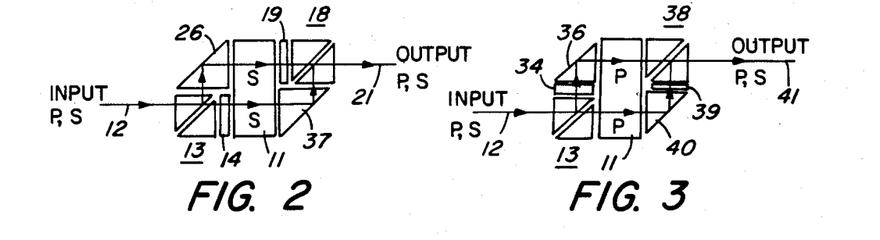
FIG. 2 is a modular version of the embodiment shown in FIG. 1.
FIG. 3 is a "p" polarization version of the modulator embodiment depicted in FIG. 2.

A modulator version of the embodiment shown in FIG. 1, is depicted in FIG. 2. A collimated input beam 12 contains either mutually perpendicularly polarized beams p and s, or it can contain unpolarized light. The beam 12 is applied through a polarization beam splitter 13, as before, which reflects a portion of the beam to a prism 26 which reflects the s polarized portion thereof toward the IMFOS 11. That portion of the beam 12 which passes through the polarization beam splitter 13 is emitted therefrom as a p polarized beam. The p polarized beam is rotated ninety degrees by the ½ wave plate 14. Thus, the prism 26 send an s polarized beam to the IMFOS 11 and the ½ wave plate 14 sends an s polarized beam to the IMFOS 11. The s polarized beam from the ½ wave plate 14, which passes through the IMFOS 11, is reflected by another prism 37 to a polarization beam splitter 18 which is operated in reverse. The s polarized beam (which had been reflected by the prism 26) passes through the IMFOS 11 and is rotated ninety degrees by the ½ wave plate 19 into a p polarized beam. The p polarized beam passes through the polarization beam splitter 18 and the s polarized beam from the prism 37 is reflected by the polarization beam splitter 18 (which operates in reverse) so that the output 21 contains both the p and the s mutually perpendicular beams.

FIG. 3 depicts a p polarization version of that described in FIG. 2. A collimated input beam 12, as before, is either unpolarized or contains mutually perpendicularly polarized beams. The input beam 12 is applied to a polarization beam splitter 13, as before. A p polarization portion of the beam passes directly from the polarization beam splitter 13 to an IMFOS 11, passing therethrough. The s polarized beam, reflected by the polarization beam splitter 13, passes through a ½ wave plate 34 which converts the s polarized beam into a second p polarized beam which, in turn, is reflected by a prism 36. The p polarized beam, reflected by the prism 36, passes through the IMFOS 11 and, then passes through a polarization beam splitter 38, which operates in reverse. The p polarized beam from the polarization beam splitter 13, which passes through the IMFOS 11, is reflected by a prism 40, and passes through a ½ wave plate 39 to the polarization beam splitter 38 which operates in reverse. The p polarized beam from the prism 40 is rotated ninety degrees by the ½ wave plate 39 to yield an s polarized beam. The s polarized beam from the ½ wave plate 39 is reflected by the polarization beam splitter 38 which operates in reverse to yield an output beam 41 which contains both the p and the s mutually perpendicular polarized beams.

Figure 4:
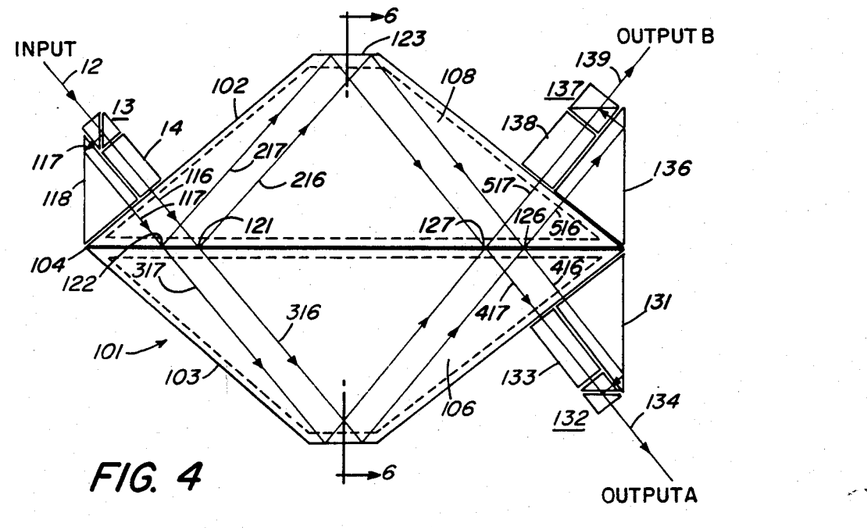
FIG. 4 is a plan view of another embodiment of the invention utilizing an IMFOS, as described in greater detail hereinafter, the dotted lines illustrating an outline of electrodes applied to such IMFOS.

Referring to FIG. 4, there is depicted, in plane view, an IMFOS 101 which is of general shape as that depicted in our copending application. The IMFOS 101 includes a first electro-optical crystal 102 and a second electro-optical 103 which are separated by a dielectric beam splitting coating 104. The first crystal 102, the second crystal 103, and the coating 104 are so oriented with portions of them juxtaposed so that light paths from one crystal can pass through the dielectric beam splitting coating 104 into the other crystal.

Figure 6:
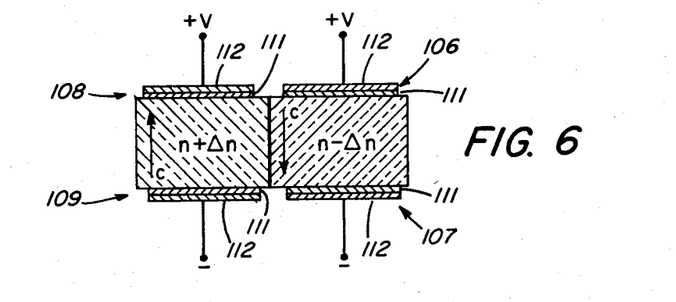
FIG. 6 is a cross-sectional view of the embodiment shown in FIG. 4, taken along the line 6—6 thereof.

Means are provided for varying the index of refraction of one of the crystals 102 with respect to that of the other crystal 103. Such means for varying the index of refraction can include electrodes 106, 107 formed on opposite sides of the crystal 103, and electrodes 108, 109 formed on opposite sides of the crystal 102. The electrodes 106, 107, 108, 109 can each be formed by depositing a layer 111 of chromium onto the respective crystals 102, 103 and, in turn, depositing individual layers of gold 112 onto the chromium layers 111. The chromium layers 111 adhere effectively to the electro-optical crystals 102, 103 and the gold layers 112 adhere effectively to the chromium layers 111. As depicted in FIG. 3, the crystallographic axes of the two crystals 102 and 103 are oriented in opposite directions. The voltages applied to the respective crystals are such that the polarities are alike in the same direction. As depicted in FIG. 6, it is positive at the top for both crystals and negative (with respect to the top) at the bottom of the two crystals. In lieu thereof, though not depicted in FIG. 6 but more fully described in the copending application, the two crystals can be oriented with their crystallographic axes in the same direction but with the voltage polarities applied in opposite directions; that is, with the crystallographic axes both directed upward, one crystal can have a positive polarity at the top and negative at the bottom, while the other crystal can have a negative polarity at the top and a positive polarity at the bottom.

An unpolarized beam of light 12, applied to the device depicted in FIG. 4, is applied to a polarization beam splitter 13. A p polarized beam from the polarization beam splitter 13 continues therethrough and is rotated by ½ wave plate 14 to yield an s polarized beam 16. The polarization beam splitter 13 also directs an s polarized beam 117 away therefrom toward a prism 118 which reflects the s polarized beam 117 into the first electro-optical crystal 102. The s polarized beam 116, upon passing through the crystal 102, hits the dielectric beam splitter 104 at a first spot 121. The s polarized beam 117 hits the polarized beam splitter 104 at a second spot 122. The beam 116, upon hitting the spot 121, is split into two parts: 50% is reflected as a beam 216, while 50% passes through the beam splitter 104 as a beam 316 into the crystal 103. In similar fashion, the beam 117, upon hitting the spot 122 of the beam splitter 104, splits into two parts: 50% is reflected as a beam 217 while the remaining 50% passes through the beam splitter 104 as a beam 317, the beam 317 passing through the crystal 103. The beams 216, 217, which have been reflected by the beam splitter 104, remain within the crystal 102 and is reflected by one surface (a reflective surface) 123 thereof down onto a second pair of spots 126, 127, respectively, so that the beam 216 can pass through the dielectric beam splitter 104 as a beam 416 or can be reflected as a beam 516, the reflected beam 516 being within the crystal 102, the beam 216 being within the crystal 103. In similar fashion, the beam 217, which had been reflected by the surface 123, upon reaching the spot 127 of the beam splitter 104, passes therethrough as a beam 417 within the crystal 103 or is reflected by the beam splitter 104 as a beam 517 within the crystal 102.

The beam 416, which passes through the crystal 103, is reflected by a prism 131 to a polarization beam splitter 132 that is operated in reverse. The beam 417, an s polarized beam, exits from the crystal 103 and is rotated ninety degrees by a ½ wave plate 133 to a p polarized beam. The emitting p polarized beam enters the polarization beam splitter 132, which is operated in reverse so as to yield an output beam 134 which contains both p and s components.

In similar fashion, the beam 516, which exits from the crystal 102, is reflected by a prism 136 toward a polarization beam splitter 137 that is operated in reverse. The s polarized beam 517 from the crystal 102 is rotated ninety degrees by ½ wave plate 138 to yield a p polarized beam, which, in turn, passes through the polarization beam splitter 137. Since the polarization beam splitter 137 also emits the s polarized beam which had been reflected by the prism 136, the output beam 139 therefrom contains both p and s mutually perpendicularly polarized components of light.

As described in our copending application, referenced hereinabove, the phase velocity for a beam of light through one crystal can be changed with respect to that of another crystal by varying the index of refraction of one crystal with respect to the other. This is achieved by applying potential of appropriate polarities across the electro-optical crystals so as to cause the phase velocity for one beam path through one crystal to be different from that of a beam path through the other crystal. Hence, as depicted in FIG. 4, the entire crystal 102 can have its index of refraction varied independently of the entire crystal 103, and vice versa.

Figure 5:
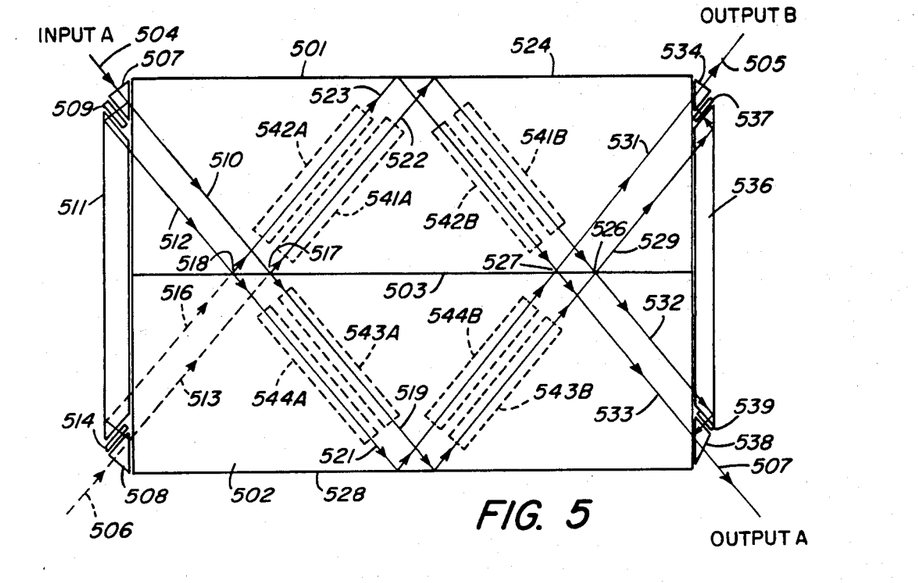
FIG. 5 is a plan view of still another embodiment of the invention, utilizing a modified IMFOS which uses rectangular shape crystals with individual electrodes being depicted in dotted line format.

Referring to FIG. 5, there is depicted a device similar to that shown in FIG. 4 with several major changes. The device shown in FIG. 5 depicts a rectangular crystal version of an IMFOS including a first crystal 501 and a second crystal 502 adjacent to each other with a dielectric beam splitting coating 503 between their juxtaposed surfaces. A first collimated input beam 504 is applied as input A to the crystal 501. Optionally, a second input beam 506 can be applied to the crystal 502. Two possible outputs can be achieved: output A can be obtained as an output beam 507, output B can be obtained as an output beam 505.

The input collimated beams 504, 506 are unpolarized or, optionally, are beams which are mutually perpendicularly polarized. The input beams 504, 506 are applied to polarization beam splitters 507, 508, respectively. The beam splitter 507 permits a p polarized beam 510 to pass therethrough into the crystal 501. The polarization beam splitter 507 reflects a p polarized beam through a ½ wave plate 509 (changing it to an s polarized beam) to a prism 511 which reflects that s polarized beam 512 within the crystal 501.

In similar fashion, the optionally applied input beam 506 to the polarization beam splitter 508 passes through to the crystal 502 as an s polarized beam 513, a portion being reflected as a p polarized beam which enters a ½ wave plate 514 rotating it to an s polarized beam which is reflected by the prism 511 as an s polarized beam 516 which enters the crystal 502. The beams 510, 512 impinge upon the dielectric beam splitter 503 at spots 517, 518, respectively. The orientation of the components are such that beams 513, 516 impinge upon the spots 517, 518, respectively. The beams 510, 512, hitting the spots 517, 518, respectively, of the dielectric beam splitting coating 503, pass directly through (at a 50% reduction) the crystal 502 as beams 519, 521, respectively, and are reflected by the 50% beam splitter 503 (at a 50% reduction) as beams 522, 523, respectively, within the first crystal 501. Similarly, the beams 513, 516, impinging upon the spots 517, 518, pass directly through (at a 50% reduction) the dielectric beam splitting coating 503 as beams 522, 523, respectively, and are reflected (at 50% reduction) as beams 519, 521, respectively.

The beams 522, 523 are reflected at the surface 524 of the crystal 501 so that the beams 522, 523 impinge upon spots 526, 527 at the dielectric beam splitting coating 503. Likewise, the beams 519, 521, upon being reflected at the surface 528 of the crystal 502, also impinge upon the spots 526, 527 of the dielectric beam splitter 503. The reflected portions of the beams 523, 524 from the dielectric beam splitter 503, and the transmitted portions of the beams 519, 521 within the crystal 501, appear as beams 529, 531, respectively. In similar fashion, the transmitted components of the beams 522, 523 and the reflected components of the beams 519, 521 within the crystal 502, appear as beams 532, 533, respectively.

The s polarized beam 531 passes through the dielectric beam splitter 534 (which is operated in reverse) as an s component of the output beam 505. The s polarized beam 529 is reflected by a prism 536 to a ½ wave plate 537 which rotates it into a p polarized beam which is reflected by the polarization beam splitter 534 so that the output beam 508 also contains a p component.

In similar fashion, the s polarized beam 533 passes through a polarization beam splitter 538 (which is operated in reverse) as an s polarized beam component of an output beam 507. The s polarized beam 532 is reflected by the prism 536 and is rotated by a ½ wave plate 539 to a p polarized beam to the polarization beam splitter 538 (which is operated in reverse) to reflect that p polarized beam as a component of the output beam 507. The output beam 507 contains both the p and s components.

The beam 522, as depicted in FIG. 5, traverses a path from the spot 517 (at the interface of the two crystals 501, 502) up to the top (as viewed in the drawing) surface 524 of the crystal 503 and down to the spot 526 at the interface of the two crystals 501, 502. Separately, it is noted that within the same crystal 501, there is a beam path 523 from the spot 518 at the interface of the two crystals 501, 502 to a top surface 504 and down to the spot 527 at the interface of the two crystals 501, 502. The paths 522, 523 are separate and distinct from each other and cross at one point as depicted in the drawing but do not interfere thereat. The index of refraction of the electro-optical crystal 501 can be varied in known fashion by varying the application of an electrical potential across the crystal. To change the index of refraction of each individual path, independent electrodes are placed across the different paths, as indicated in dotted outline. The electrodes are both at the top and the bottom of the crystal. The electrodes for the paths 522 include one set of electrodes 541A, 541B. The electrodes 541A, 541B are coupled to each electrically, but need not be performed at a surface of the crystal. In similar fashion, electrodes encompassing the path 523 can include electrodes 542A, 542B deposited at the top and bottom of the crystals encompassing the path 523. The electrodes 542A and B are coupled together.

Electrodes 542A, 543B encompass beam paths 519 from the spot 517 to the surface 528 and to the spot 526, respectively. Similarly, electrodes 544A, 544B encompass the beam path 521 from the spot 518 to the surface 528 and to the spot 527, respectively.

Thus, when the polarization-insensitive optical switch and dual channel carrier multiplexer, in accordance with this invention, is utilized as a switch, the phase retardation of both beams (that is, the entering p polarized beam and the entering s polarized beam) is identical and a single set of electrodes is used, as depicted generally in FIG. 4. When the invention is utilized as a multiplexer, each beam propagates between its own set of electrodes, as indicated in FIG. 5, and therefore can be modulated with different modulation signals. At each output port, as discussed hereinabove, there are two beams emitted, though not necessarily at the same time, and these two beams are combined utilizing a polarization beam splitter operated in reverse after one beam has past through a ½ wave plate. The output of the polarization beam splitter is a single light beam which can be coupled into a single fiber at each output port.

Various modifications can be performed without departing from the spirit and scope of this invention. For example, the two polarized beams, when modulated separately, need not be recombined into a single fiber. Two output focusing optics can direct each into separate output fibers.

What is claimed is:

1. Polarization-insensitive optical switch apparatus for switching a collimated input beam between two output means comprising
   a first polarization beam splitter for receiving and splitting said collimated input beam into two perpendicularly polarized beams;
   a first polarization rotating means for rotating a first of said two perpendicularly polarized beams by ninety degrees so that the rotated polarized beam and a second of said perpendicularly polarized beams are each polarized in the same direction;
   means for reflecting one of said first and said second beams so that the reflected beam and the other of said first and said second beams traverse parallel paths;
   a first electro-optical crystal having
      a first surface adapted to receive said reflected one beam and said other beam for transmission through said first crystal,
      a second surface adapted to receive such transmitted beams from said first surface of said first crystal at a first pair of spots,
      a first reflective surface oriented to receive light beams from said first pair of spots of said second surface of said first crystal and to reflect such light beams,
      a third surface adapted to receive such reflected light beams from said first reflective surface of said first crystal upon a second pair of spots, and
      a fourth surface adapted to externally pass light beams impinged thereupon from said second pair of spots of said first crystal;
   a second electro-optical crystal having
      a first surface,
      a second surface oriented to receive transmitted light from said second surface of said first crystal at a first pair of spots,
      a first reflective surface oriented to receive light from said first pair of spots of said second surface of said second crystal and to reflect such received light,
      a third surface adapted to receive such reflected light from said first reflective surface of said second crystal upon a second pair of spots, and
      a fourth surface adapted to externally pass light beams impinged thereupon from said second pair of spots of said second crystal; a dielectric beam splitting coating;
   said first crystal, said second crystal, and said coating being so oriented that
      said first pair of spots of said second surface of said first crystal, and said first pair of spots of said second surface of said second crystal are substantially juxtaposed with a first portion of said coating oriented therebetween, and
      said second pair of spots of said third surface of said first crystal, and said second pair of spots of said third surface of said second crystal are substantially juxtaposed with a second portion of said coating oriented therebetween;
   means for varying the index of refraction of one of said crystals with respect to the index of refraction of the other of said crystals;
   means associated with said fourth surface of said first crystal for reflecting one light beam from one spot of said second pair of spots of said first crystal;

a second polarization rotating means for rotating a first of said light beams from said fourth surface of said first crystal by ninety degrees so that the rotated first light beam and the unrotated second light beam are perpendicularly polarized with respect to each other;

a second polarization beam splitter, operated in reverse, coupled to receive the perpendicularly polarized output beams from said first crystal, and to provide a first single light beam which can be coupled to a first optical output means;

means associated with said fourth surface of said second crystal for reflecting one light beam from one spot of said second pair of spots of said second crystal;

a third polarization rotating means for rotating a first of said light beams from said fourth surface of said second crystal by ninety degrees so that the rotated first light beam and the unrotated second beam, from said second crystal, are perpendicularly polarized with respect to each other; and a third polarization beam splitter, operated in reverse, coupled to receive the perpendicularly polarized output beams from said second crystal, and to provide a second single light beam which can be coupled to a second optical output means.

2. Polarization-insensitive optical switching apparatus for switching a collimated input beam between two output means comprising a first polarization beam splitter for receiving and splitting said collimated input beam into two perpendicularly polarized beams;

a first polarization rotating means for rotating a first of said two perpendicularly polarized beams by ninety degrees so that the rotated polarized beam and a second of said perpendicularly polarized beams are each polarized in the same direction;

means for reflecting one of said first and said second beams so that the reflected beam and the other of said first and said second beams traverse parallel paths;

polarization-sensitive interferometric multimode fiber optic switch means for receiving said reflected beam and said other beam at one input thereof, and for selectively providing said reflected beam and said other beam at a first pair of outputs and at a second pair of outputs;

means associated with said first pair of outputs for reflecting a beam selected from said reflected beam and said other beam;

a second polarization rotating means for rotating a first of said light beams from said first pair of outputs by ninety degrees so that the rotated first light beam and the unrotated second light beam are perpendicularly polarized with respect to each other;

a second polarization beam splitter, operated in reverse, coupled to receive the perpendicularly polarized output beams from said first pair of outputs, and to provide a first single light beam which can be coupled to a first optical output means;

means associated with said second pair of outputs for reflecting a beam selected from said reflected beam and said other beam;

a third polarization rotating means for rotating a first of said light beams from said second pair of outputs by ninety degrees so that the rotated first light beam from said second pair of outputs and the unrotated second light beam from said second pair of outputs are perpendicularly polarized with respect to each other; and a third polarization beam splitter, operated in reverse, coupled to receive the perpendicularly polarized output beams from said second pair of outputs, and to provide a second single light beam which can be coupled to a second optical output means.

3. The polarization-insensitive optical switching apparatus as recited in claim 2 wherein the index of refraction for one portion of said polarization-sensitive interferometric multimode fiber optic switch means is variable from the index of refraction for a second portion of said polarization-sensitive interferometric multimode fiber optic switch means.

4. The polarization-insensitive optical switching apparatus as recited in claim 2 wherein said reflected one beam traverses a first path and a second path within a first portion and a second portion, respectively, of said polarization-sensitive interferometric multimode fiber optic switch means, wherein said other beam traverses a third path and a fourth path within a third portion and a fourth portion, respectively, of said polarization-sensitive interferometric multimode fiber optic switch means, wherein the index of refraction of said first portion is variable from said index of refraction of said second portion, and wherein the index of refraction of said third portion is variable from said index of refraction of said fourth portion.

* * * * *